United States Patent [19]
Bramson

[11] Patent Number: 5,106,394
[45] Date of Patent: Apr. 21, 1992

[54] FIBER OPTIC POLISHING SYSTEM

[75] Inventor: Michael Bramson, Ridgecrest, Calif.

[73] Assignee: The United States of America as represented by the Secretary of the Navy, Washington, D.C.

[21] Appl. No.: 591,208

[22] Filed: Oct. 1, 1990

[51] Int. Cl.$^5$ ................................................ C09C 1/68
[52] U.S. Cl. ........................................ 51/309; 51/304; 106/3
[58] Field of Search ................... 51/304, 309; 106/3

[56] References Cited

U.S. PATENT DOCUMENTS

| | | | |
|---|---|---|---|
| 4,226,623 | 10/1980 | Koshiyama et al. | 106/3 |
| 4,389,819 | 6/1983 | Williamson et al. | 51/309 |
| 4,529,410 | 7/1985 | Khaladji et al. | 51/309 |
| 4,601,755 | 7/1986 | Melard et al. | 51/309 |
| 4,630,884 | 12/1986 | Jubinski | 350/96.15 |
| 4,631,072 | 12/1986 | Koller | 51/309 |
| 4,769,073 | 9/1988 | Tastu et al. | 51/309 |
| 4,786,325 | 11/1988 | Melard et al. | 51/309 |
| 4,853,000 | 8/1989 | Potter | 106/3 |
| 5,026,421 | 6/1991 | Le Loarer et al. | 106/3 |

Primary Examiner—William R. Dixon, Jr.
Assistant Examiner—Willie J. Thompson
Attorney, Agent, or Firm—Harvey A. Gilbert; Melvin J. Sliwka; John L. Forrest, Jr.

[57] ABSTRACT

An optical glass fiber polishing apparatus and method utilizing a slurry comprised of water, CeO, glycerin and where needed, a base such as NaOh, to realize transmission loss in the fiber as it is polished towards the fiber core. The intensity of light introduced at one end of the fiber is measured at the opposite end, continuously and without interruption of the polishing, to determine polishing progress through the cladding towards the core.

8 Claims, 2 Drawing Sheets

5,106,394

FIBER OPTIC POLISHING SYSTEM

This invention relates to optical fiber polishing and lapping and in particular to removal of optical material such as cladding from the fiber and creating optical surfaces on the fiber.

BACKGROUND OF THE INVENTION

Optical fiber in its simplest form, is composed of two concentric regions of glass. The inner region is known as the core and the outer region is known as the cladding. A plastic coating known as the buffer is typically applied to the fiber and surrounding the cladding for protection of the fiber.

The index of refraction of the core is greater than the index of refraction of the cladding, thus, light introduced to the fiber via a free end is guided by total internal reflection. The propagating mode is contained in the core and non-propagating evanescent fields, which decay rapidly toward zero density radially from the core-cladding boundary, reside in the cladding. Furthermore the cladding, due to its thickness, for all intents and purposes, totally contains the evanescent fields.

The propagating mode in the core, can be affected by perturbing the evanescent field in the cladding. By doing so, useful devices can be fabricated out of fiber. One particularly useful device for fiber optic gyro (FOG) applications is known as an evanescent coupler. The evanescent coupler relies on the evanescent fields in one fiber to excite a propagating mode in another fiber, thereby coupling energy from one fiber to another.

Because the evanescent fields decay rapidly from the corecladding interface, it is necessary to remove most of the cladding in a small area from both fibers, so that the interaction may take place. Removing the cladding can be accomplished by a glass polishing procedure. The first step in the polishing procedure would be to strip some buffer material in the middle of a length of fiber. Stripping can be accomplished with a commercially available, heated filament, wire stripper. The fiber would then be mounted on a curved surface. The curved surface or substrate could be machined ceramic block for example, configured with one face to which the optical fiber can be attached. Attaching the fiber to the substrate can be accomplished with an adhesive, such as an epoxy. The fiber-substrate assembly is mounted to the oscillating arm of a polishing machine. The machine polishing wheel would typically have a fine diamond abrasive pad affixed to it and the polishing slurry would drip onto the pad and be spread around by the fiber as it is polished.

At the completion of the polishing operation, the fiber will have an optical flat surface polished on to it. A coupler is then made by joining two such structures at the flat region. To achieve a given coupling performance, the polishing must stop at a specified distance from the core. In typical production fiber, the core tends to wander slightly within the cladding. Therefore, the distance from the core to the cladding at the end of a fixed time polish operation, would vary from one fiber length to another fiber length. Also the distance of the flat from the core at the end of the polishing process needs to be something on the order of a few microns. Therefore, not only is there no way to make a physical thickness measurement during the above described process to determine distance from the core, but there would be no way to develop an empirical scheme based on grind time to within the accuracy required.

Currently, the proximity to the core from the optical flat is determined by periodically removing the fiber and substrate from the polishing machine, launching light into the fiber, looking at the output on a power meter, and performing an oil drop test. The oil used is an index of refraction formulated optical oil chosen to have a greater index of refraction than the core of the fiber. As more cladding is removed, subsequently higher evanescent field density is exposed. If the cladding is polished down to the proximity of the core and the oil is applied to the polished region, a power drop will be noted on the power meter since a portion of the light will couple out of the fiber due to the interaction between the evanescent field and the oil. The closer the core is to the polished region, the greater the power drop will be. An empirical polishing procedure can then be formulated based on the results of the oil drop test. This current methodology is time consuming and can not be automated.

Another method is described in U.S. Pat. No. 4,630,884 which teaches a method and apparatus for monitoring and polishing an optical fiber where the polishing is periodically or occasionally stopped to take readings of coherent light then communicated into the fluid waveguide between the polishing surface and the fiber and coupled from the fluid into the fiber. A light intensity monitor coupled to one end of the fiber measures light coupled into the fiber from the light source through the fluid waveguide. Also taught is the use of a long chain polymer such as polypropylene to improve laminar flow of the transparent fluid constituting the fluid waveguide. Thus, the method of this patent requires interruption of the lapping or polishing process to obtain readings of the extent the polishing has worked to produce fiber cladding removal. This interruption prevents the process from being efficiently automated to produce the faster, reliable and repeatable results of the subject invention. Also, the lubricating fluid, with or without the addition of any additive to improve laminar flow is temperature sensitive. Thus, light coupling through the fluid waveguide into the optical fiber will vary from procedure to procedure and during each procedure. Thus, relying on the fluid waveguide to communicate the light coupled into or out of the core and used as the basis for measuring the progress of the lapping or polishing process can introduce uncertainty and unreliability.

SUMMARY OF THE INVENTION

It is thus an object of the present invention to provide an apparatus and method for removal of cladding from optical fiber while simultaneously and continuously introducing light at one end and measuring the amount emerging from the opposite end during and without any interruption of the polishing or lapping removal of the cladding.

It is yet another object of the present invention to provide an apparatus and method for optical fiber cladding removal that permits measurement of the extent of cladding removal by light transmission loss that is not temperature dependent or sensitive.

The present invention is an apparatus and method for polishing or lapping an optical fiber to remove cladding, to create an optical flat and for other such purposes. The apparatus includes a means for abrasively polishing the optical fiber, a non-coupling and transmission attenuating slurry disposed between the optical fiber and the abrasive polishing means, an illumination source coupled to one end of the fiber an a light intensity measuring device coupled at the opposite end of the fiber. The slurry composition is such that light transiting the optical fiber from the light source at one end of the fiber to the light intensity measuring device at the opposite end of the fiber is not coupled out of the fiber via the interfacing slurry at the locale where polishing is taking place. Instead the slurry causes light transiting the fiber to become attenuated via the portion of evanescent field in the slurry. The subject invention thus permits continuous and temperature insensitive measurement of the amount of cladding removal during and without interruption of the polishing or lapping. The invention can be automated and in all events produces a reproducible result faster and more reliably than prior art methods and apparatuses.

BRIEF DESCRIPTION OF THE DRAWINGS

In the detailed description of the present invention which follows reference will be made to the accompanying drawings in which.

DETAILED DESCRIPTION OF THE INVENTION

Figure 1:
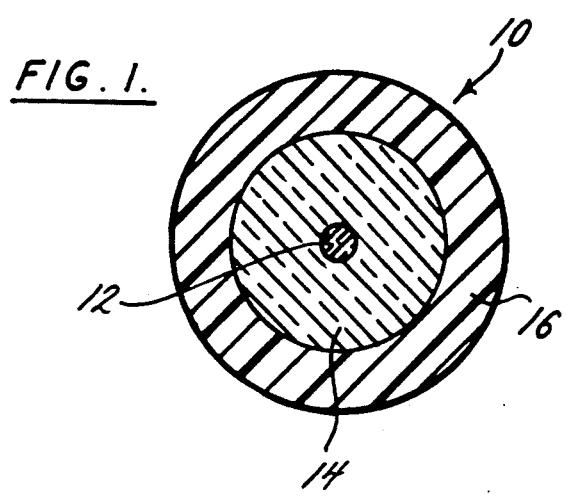
FIG. 1 is a sectional view through an optical fiber.

With reference to FIG. 1 an optical fiber 10 is shown consisting of an inner core 12 surrounded by cladding 14 which is then encased in and surrounded by the protective plastic buffer 16.

Figure 2:
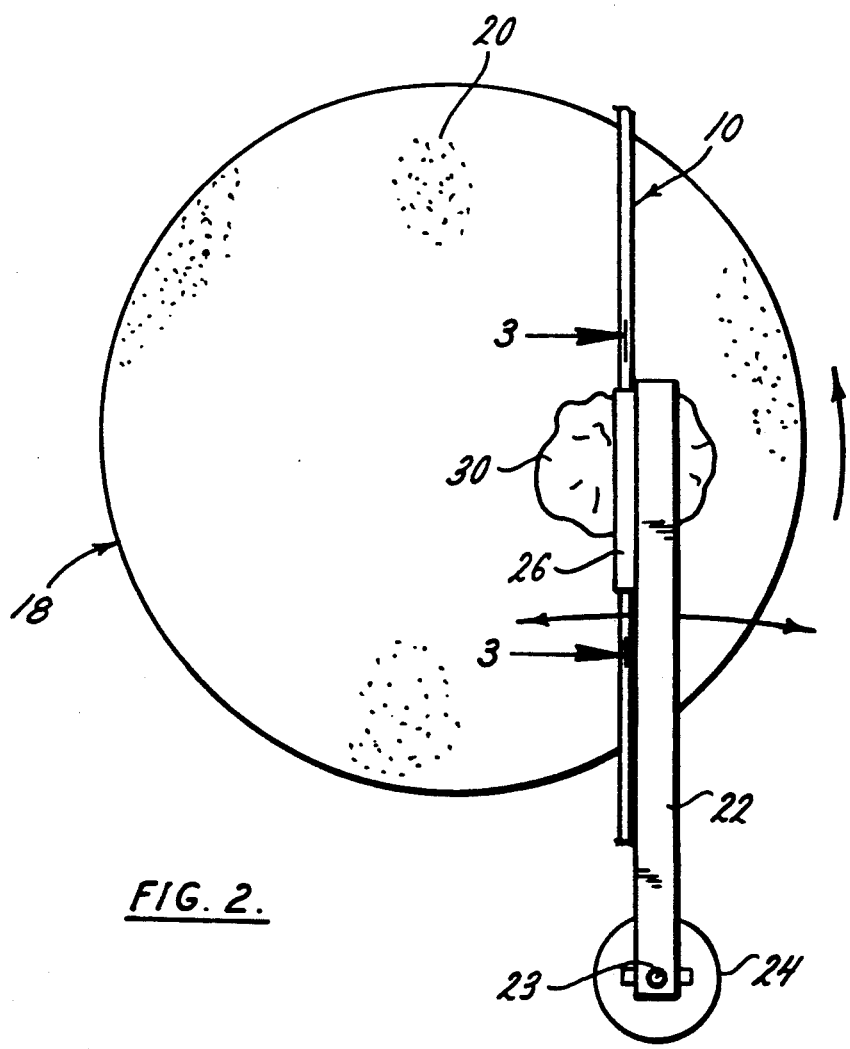
FIG. 2 is an overhead view of the apparatus of the present invention.

The present invention is the polishing apparatus 18 shown in FIG. 2. The apparatus 18 is comprised of the abrasive surface 20, shown in FIG. 2 as a rotating disk. The arm 22 is attached movably at the pivot point 23 to the stationary pivot support 24. The block 26 with fiber 10 attached is mounted on arm 22 which is configured to receive and securely hold the fiber and block 26 assembly which is then 10 immersed in the slurry 30 interfacing the fiber 10 with the abrasive surface 20. The fiber 10 is affixed to the block 26 using a metallic particulate bearing elastic adhesive, such as metallic nail polish cured at approximately 40 degrees celsius for five (5) minutes and easily removed with a conventional solvent. Nail polish made by Revlon, specifically the "Hard as Nails" brand, has been found to be preferred for my invention. The elastic properties of the nail polish after curing permit it to withstand the polishing operation. After polishing is completed it is easily removed from the fiber 10 and the block 26 using acetone or other solvent. The block 26 is preferably machined from sheet ceramic stock an given a curved surface having, for example a 20 cm radius of curvature, to which the fiber 10 is affixed.

Figure 3:
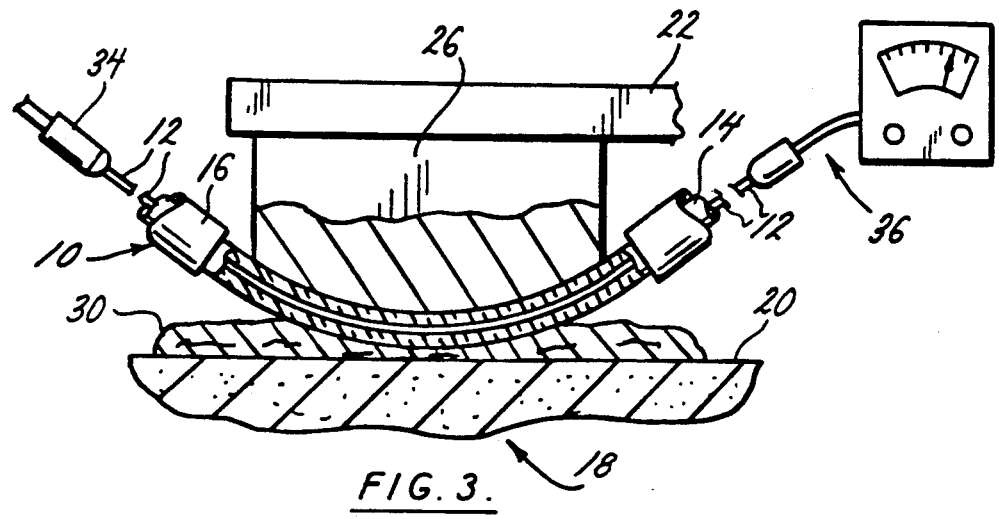
FIG. 3 is a partial sectional view of the portion of the present invention where polishing is effected prior to operation.
Figure 4:
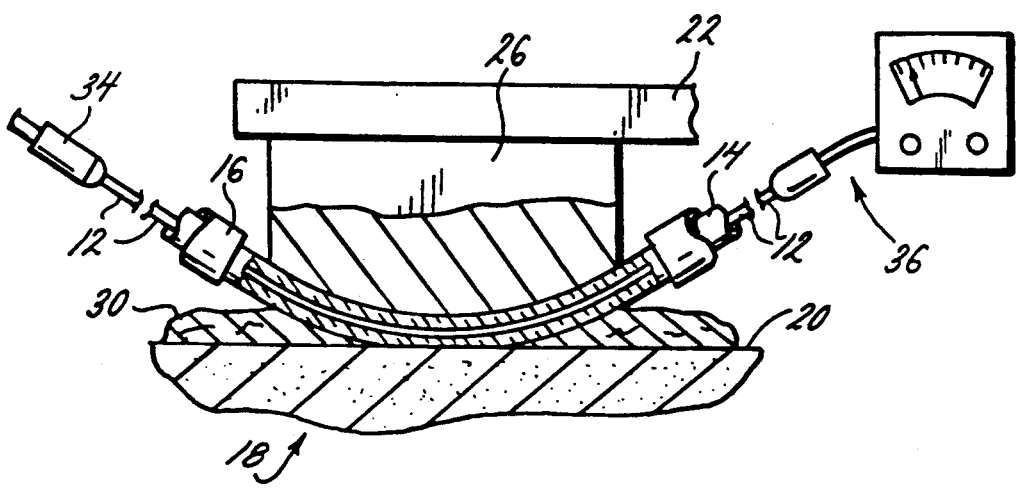
FIG. 4 is the same view as FIG. 3 after some polishing action and optical fiber material removal.
Figure 5:
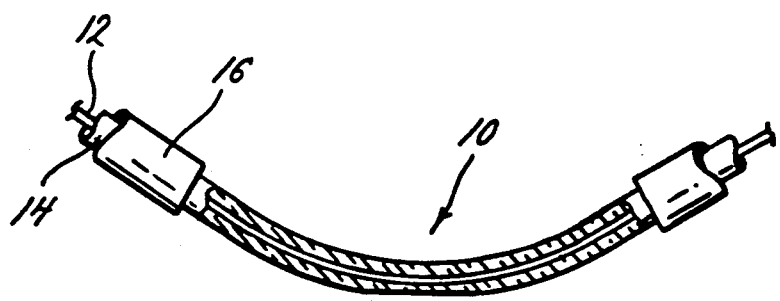
FIG. 5 is a partial sectional view of the optical fiber after removal of material and creation of a flat surface in the fiber.

As shown in FIG. 3 and FIG. 4 the light source 34 is coupled to one end and the light measuring device 36 is coupled to the opposite end of the optical fiber 10.

The slurry 30 of the present invention differs in composition and function from other slurries in use.

A typical slurry and basic polishing slurry consists of a water/cerium oxide mixture. Water and cerium oxide alone do not produce a noticeable optical loss during polishing until the fiber is ground too close to the core to fabricate a useful device. The slurry of the present invention differs from the basic water/cerium oxide mixture as follows:

20.2% $H_2O$
32.7% $CeO$
44.9% Glycerin
2.2% $NaOH$

The above is formulated by weight and represents a particular composition having a desired index of refraction for a particular optical fiber. This slurry provides a transmission loss mechanism which is temperature insensitive. This is, of course, totally different from the temperature sensitive light coupling mechanism of the more typical slurries in use.

The glycerin raises the index of refraction of the slurry. Glycerin is preferred because it is water soluble. The glycerin however tends to act as a lubricant and impedes the polishing operation thus lengthening the time of the process. Hydroxide ions are known to attack glass. Therefore, the base sodium hydroxide, is added to bring the polish time back to what it was prior to the addition of glycerin.

The optical loss mechanism due to the glycerin, water, and cerium oxide is in general a two part process-transmission loss and coupling loss. First, if the index of refraction of the slurry is greater than or equal to that of the core, light will couple out of the fiber over the polished region. Second, an additional loss is incurred due to attenuation of the propagating mode via the evanescent field by the cerium oxide. Various concentrations of water and glycerin can be used to vary the refractive index of the slurry.

If the refractive index of the slurry, which is governed by the water and glycerin, is allowed to be greater than the index of the core, light will couple out of the fiber as the core is approached during polishing. The amount of light coupled out, however, will be a function of the index of refraction of the solution for a given proximity to the core. Since index of refraction is temperature sensitive, the same slurry will produce non-repeatable results as the laboratory temperature varies.

The water/glycerin solution represented in the above formula is chosen such that the index of refraction is just under that of the core of the optical fiber, used to develop the slurry. With this being the case, the light no longer couples out of the fiber but instead is attenuated via the evanescent field, by the cerium oxide. By eliminating the coupling loss mechanism, the transmission loss becomes independent of temperature induced index changes over the temperature fluctuations normally encountered in a laboratory or production facility. The glycerin then increases the evanescent field density via dielectric action so that the cerium oxide loss mechanism produces a significant optical power drop in the fiber. Since the index of refraction of the glycerin is greater than that of the core glass and the index of refraction of the water is less than that of the core glass these two ingredients are combined in amounts to produce the necessary index of refraction for the slurry to be just less than that of the core to obtain the desired transmission loss. Thereafter, the proportion of the two should be maintained constant for the particular core glass of the fiber being polished. The sodium hydroxide (NaOH) has a negligible effect on the index of refraction at the concentration used and is added afterward to enhance the polishing speed. If speed is not a concern, NaOH need not be used at all. In this event the formulation by weight would be:

33.4% CeO
20.7% $H_2O$
45.9% glycerin and where the percentages of the glycerin, $H_2O$ and CeO are reduced to compensate for the addition of said NaOH while the proportion of glycerin to $H_2O$ to obtain the said index of refraction is maintained.

OPERATION

In operation an optical fiber 10 is secured to a block 26 by means of an adhesive, preferably nail polish. The block 26 is affixed to the arm 22, and slurry 30 is deposited upon the abrasive surface 20 between that surface and the fiber 10 on the facing surface of the block. The block 26 and the surface 20 are brought together so that contact with the abrasive surface 20 is made with the fiber 10 through the slurry 30. In the embodiment shown in FIG. 2 the abrasive surface 20 is shown rotating beneath the arm 22 which is cycling normal to and across the path of rotation. Other means for bringing the abrasive polishing means into contact with the fiber 10 and moving one relative to the other, and through the slurry 30 can be used as desired. As seen in FIG. 3 and FIG. 4 light is coupled into the fiber at one end before polishing, from a source such as a diode laser. The other end of the fiber is input to an optical power meter and the reading noted. The polishing apparatus is activated and when a through-put loss of 1.5 dB is seen, the polisher is stopped. The 1.5 dB loss with the slurry is predetermined and corresponds to a 20 dB oil drop test loss with 1.462 index oil for the fiber used to develop the slurry. The total polish time of the present invention is 550 seconds for this case and is the same as with the water/cerium oxide slurry used prior to this invention. However, time is dependent on the abrasive action applied and the pH of the slurry. The 1.5 dB loss does not change as the temperature of the slurry on the polished region is altered with a Freon spray and heat gun.

Any water soluble liquid capable of increasing the slurry index of refraction can be substituted in place of the glycerin. One less slippery would permit NaOH to be eliminated. Any base can be substituted in place of the NaOH. The water/glycerin ratio may have to be adjusted slightly to yield optimum results for a particular fiber since in general, each type of fiber has a different core index of refraction. The cerium oxide concentration is not especially critical. Finally, finely powdered walnut shells may be added to increase polish speed.

Obviously many modifications and variations of the present invention are possible in the light of the above teachings. It is therefore to be understood that within the scope of the appended claims the invention may be practiced otherwise than as specifically described.

What I now claim as my invention is:

1. A slurry for polishing an optical fiber having a core surrounded by cladding wherein said slurry, comprises:

a binary liquid comprising water and another water soluble liquid ingredient having an index of refraction greater than water and greater than the core of the particular optical fiber being polished, the proportion of water to said other water soluble liquid ingredient being adjusted to yield an index of refraction for said binary liquid that is just less than that of said optical fiber core index of refraction; and an amount of CeO adequate to facilitate polishing and produce a transmission loss in the fiber over the region being polished of said fiber.

2. The slurry of claim 1 wherein said other water soluble liquid ingredient having an index of refraction greater than that of water and the index of refraction of the core of said optical fiber is glycerin.

3. The slurry of claim 1 wherein said slurry further comprises a base in an amount adequate to obtain the desired extent of polishing in the minimum amount of time.

4. The slurry of claim 3 wherein said base is NaOH.

5. A slurry for polishing an optical fiber having a core surrounded by cladding wherein said slurry, comprises, by weight:

33.4% CeO
20.7% $H_2O$
45.9% glycerin and where the percentages of glycerin and water are each adjusted in relation to the other about the above percentages to obtain the slurry index of refraction slightly less than that for the core index of refraction of the optical glass fiber being polished.

6. The slurry of claim 5 further comprising by weight:

0% to 5% NaOH and the percentage of the glycerin, $H_2O$, and CeO combined is reduced to compensate for the addition of said NaOH while the proportion of glycerin to $H_2O$ to obtain the said slurry index of refraction is maintained.

7. An optical fiber polishing slurry, comprising, by weight:

20.2% $H_2O$
32.7% CeO
44.9% glycerin
2.2% NaOH and where the percentages of glycerin and water are each adjusted in relation to each other about the above percentages to obtain the slurry index of refraction slightly less than that for the core index of refraction of the glass fiber being polished.

8. The slurry of claim 7 further comprising finely powdered walnut shells.

* * * * *